United States Patent
Uemura

(10) Patent No.: US 7,359,073 B2
(45) Date of Patent: Apr. 15, 2008

(54) IMAGE PRINTING APPARATUS AND CONTROL METHOD THEREFOR

(75) Inventor: Hiroshi Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 942 days.

(21) Appl. No.: 10/410,301

(22) Filed: Apr. 10, 2003

(65) Prior Publication Data

US 2003/0193543 A1 Oct. 16, 2003

(30) Foreign Application Priority Data

Apr. 15, 2002 (JP) .............................. 2002-112612
Mar. 28, 2003 (JP) .............................. 2003-092826

(51) Int. Cl.
*G06F 15/00* (2006.01)
*G06K 1/00* (2006.01)

(52) U.S. Cl. ................... 358/1.14; 358/1.14; 358/3.26; 358/3.27

(58) Field of Classification Search ................. 358/1.1, 358/1.9, 1.11–1.18, 3.26–3.27; 347/12, 57
See application file for complete search history.

(56) References Cited

U.S. PATENT DOCUMENTS

| | | | |
|---|---|---|---|
| 4,313,124 A | 1/1982 | Hara | |
| 4,345,262 A | 8/1982 | Shirato et al. | |
| 4,459,600 A | 7/1984 | Sato et al. | |
| 4,463,359 A | 7/1984 | Ayata et al. | |
| 4,558,333 A | 12/1985 | Sugitani et al. | |
| 4,608,577 A | 8/1986 | Hori | |
| 4,723,129 A | 2/1988 | Endo et al. | |
| 4,740,796 A | 4/1988 | Endo et al. | |
| 6,027,198 A | 2/2000 | Tanaka et al. | |
| 6,097,499 A * | 8/2000 | Casey et al. | ............... 358/1.16 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |
| JP | 8-44268 | 2/1996 |
| JP | 08044268 A * | 2/1996 |
| JP | 11-259248 | 9/1999 |

* cited by examiner

*Primary Examiner*—Gabriel Garcia
*Assistant Examiner*—Thierry L. Pham
(74) *Attorney, Agent, or Firm*—Fitzpatrick, Cella, Harper & Scinto

(57) ABSTRACT

When transfer of a data frame from a host computer delays during image printing using data transferred from the host computer, a sequence controller (203) determines that generation of print data does not catch up with image printing and a time delay is generated in image printing. A data processor (201) divides a data frame (DF) transmitted immediately before generation of the time delay into overlapping data c and the remaining data a. The data processor further divides the overlapping data c into two overlapping data $c_1$ and $c_2$. The data $c_2$ is extracted from the data frame (DF), held by an overlapping data holding unit (205), and added to the start of the first data frame (DI) transmitted after generation of the time delay. In this manner, when data transfer is left undone during image printing and a printing time difference is generated in image printing, part ($c_2$) of image printing before generation of the time delay is performed after the time delay, suppressing image degradation.

14 Claims, 12 Drawing Sheets

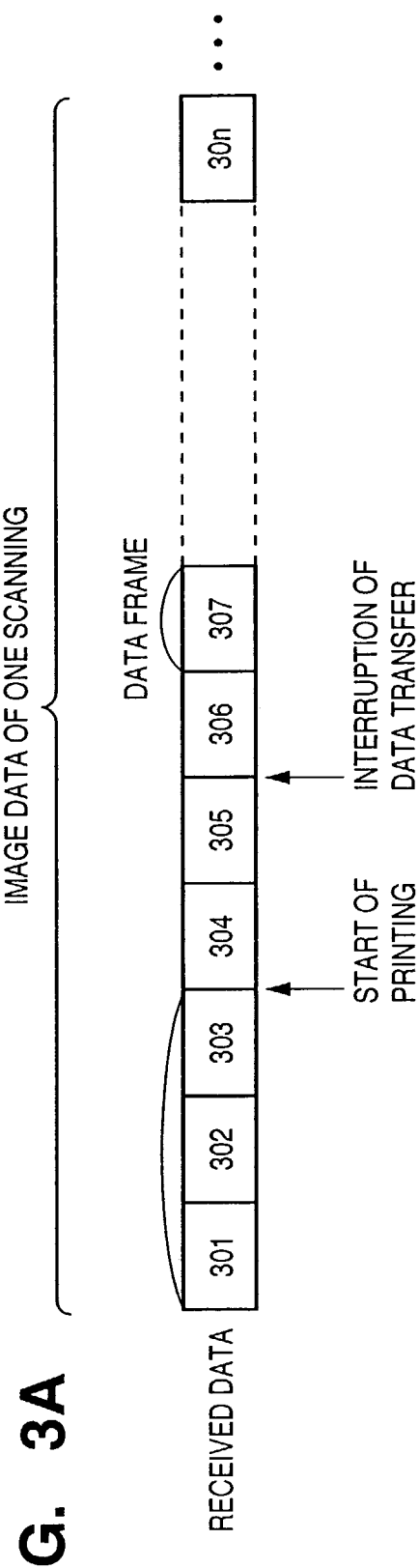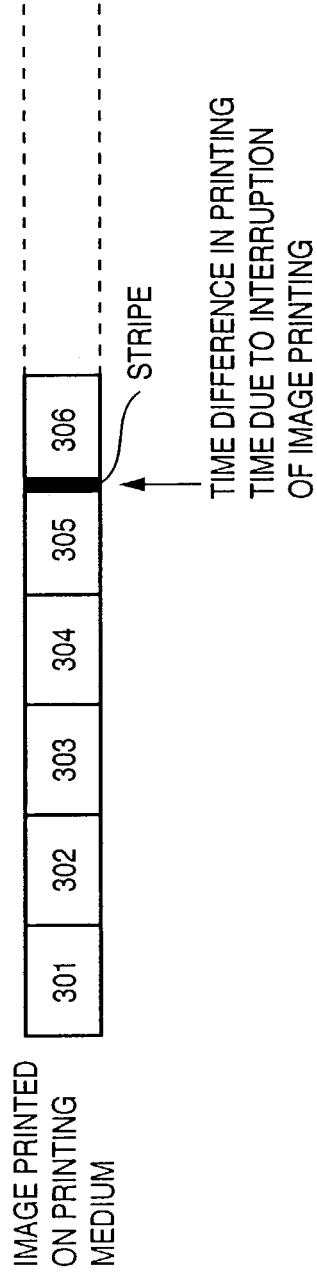
FIG. 3A
FIG. 3B

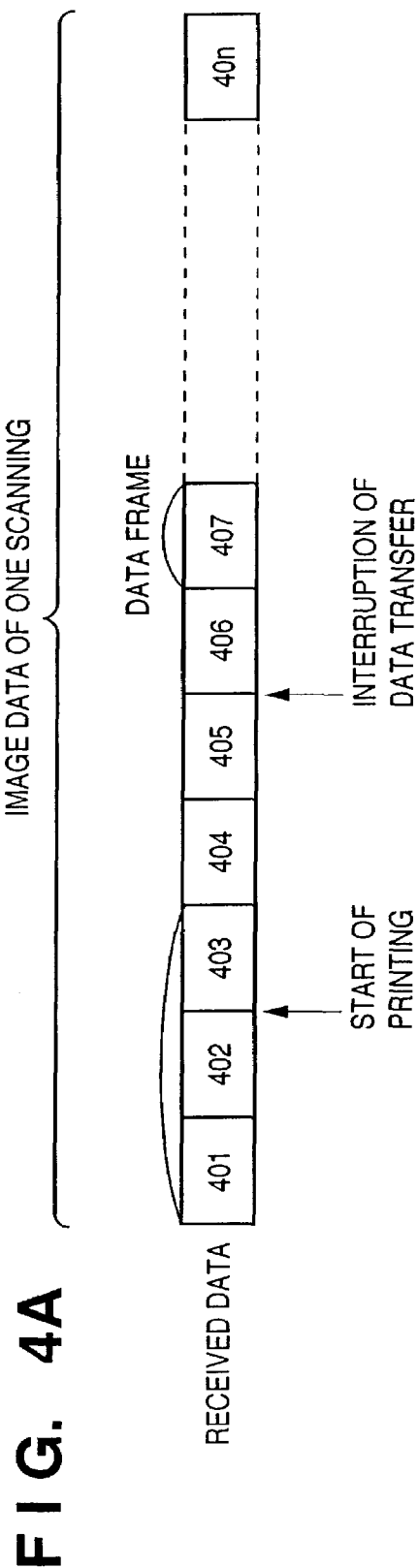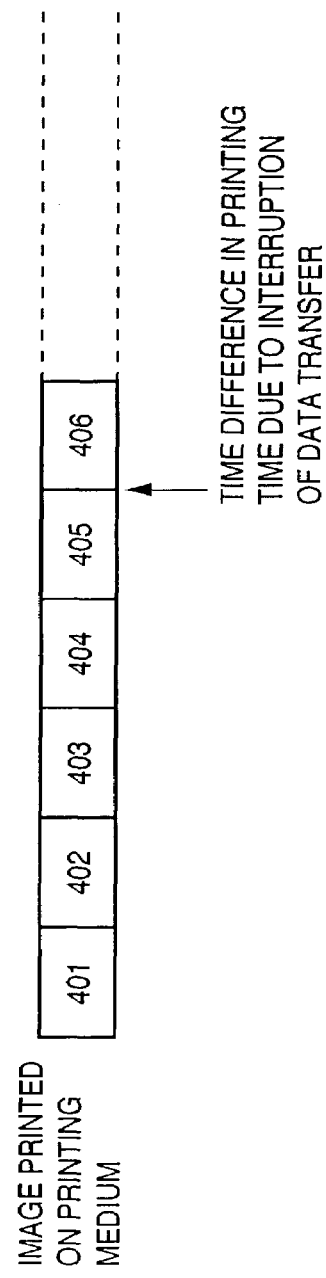
FIG. 4A
FIG. 4B

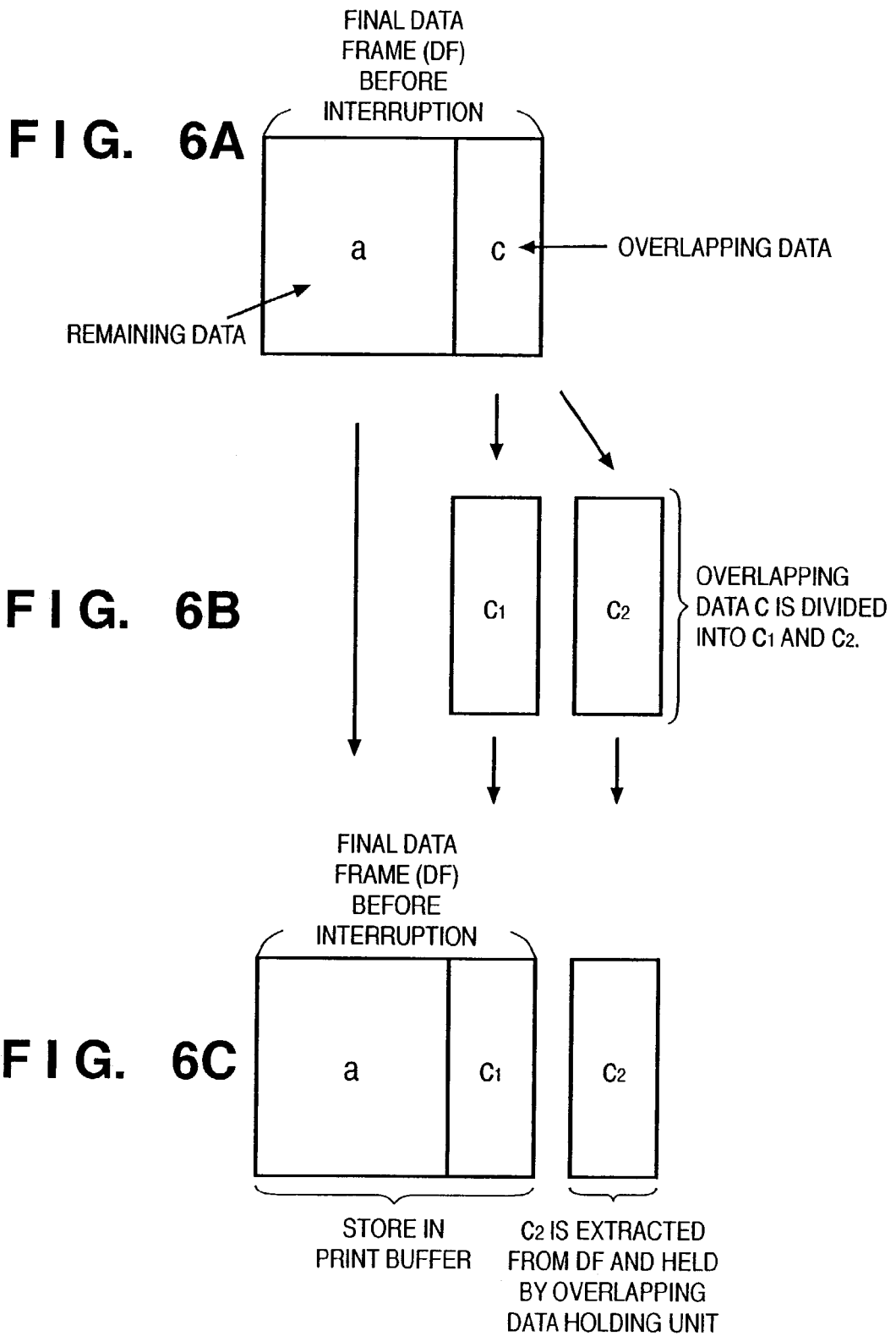

FIG. 7A

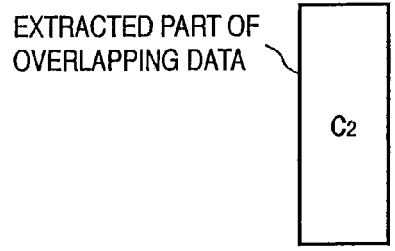
EXTRACTED PART OF OVERLAPPING DATA

FIRST DATA FRAME AFTER INTERRUPTION
RECEIVED (DI)

FIG. 7B

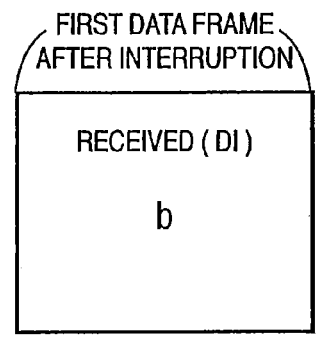
FIRST DATA FRAME AFTER INTERRUPTION

EXTRACTED PART $C_2$ OF OVERLAPPING DATA IS ADDED TO DATA FRAME

IMAGE DATA FIRST RECEIVED AFTER INTERRUPTION

FIG. 7C

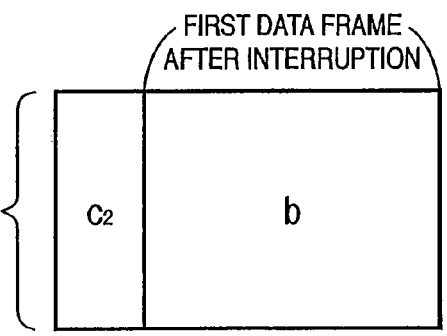

IMAGE BEFORE INTERRUPTION
IMAGE AFTER INTERRUPTION

IMAGE PRINTED BY IMAGE DATA BEFORE AND AFTER INTERRUPTION

IMAGE PRINTED BY OVERLAPPING DATA (PORTIONS PRINTED BEFORE AND AFTER INTERRUPTION COEXIST.)

FIG. 7D

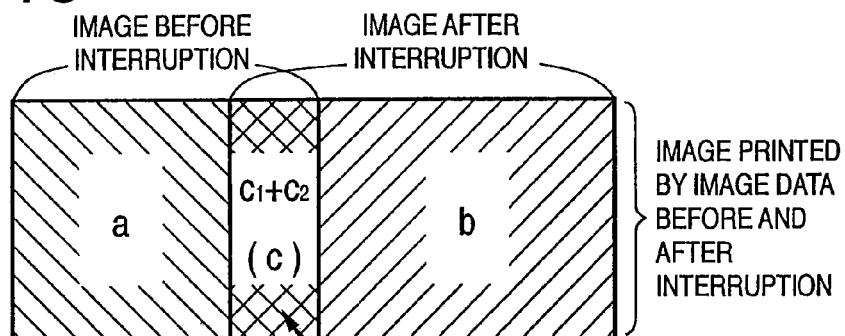

IMAGE DATA FINALLY RECEIVED BEFORE INTERRUPTION

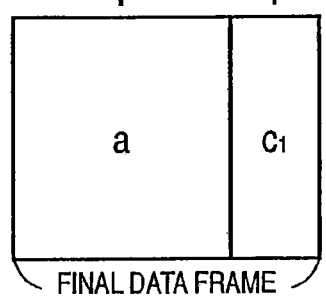
FINAL DATA FRAME BEFORE INTERRUPTION

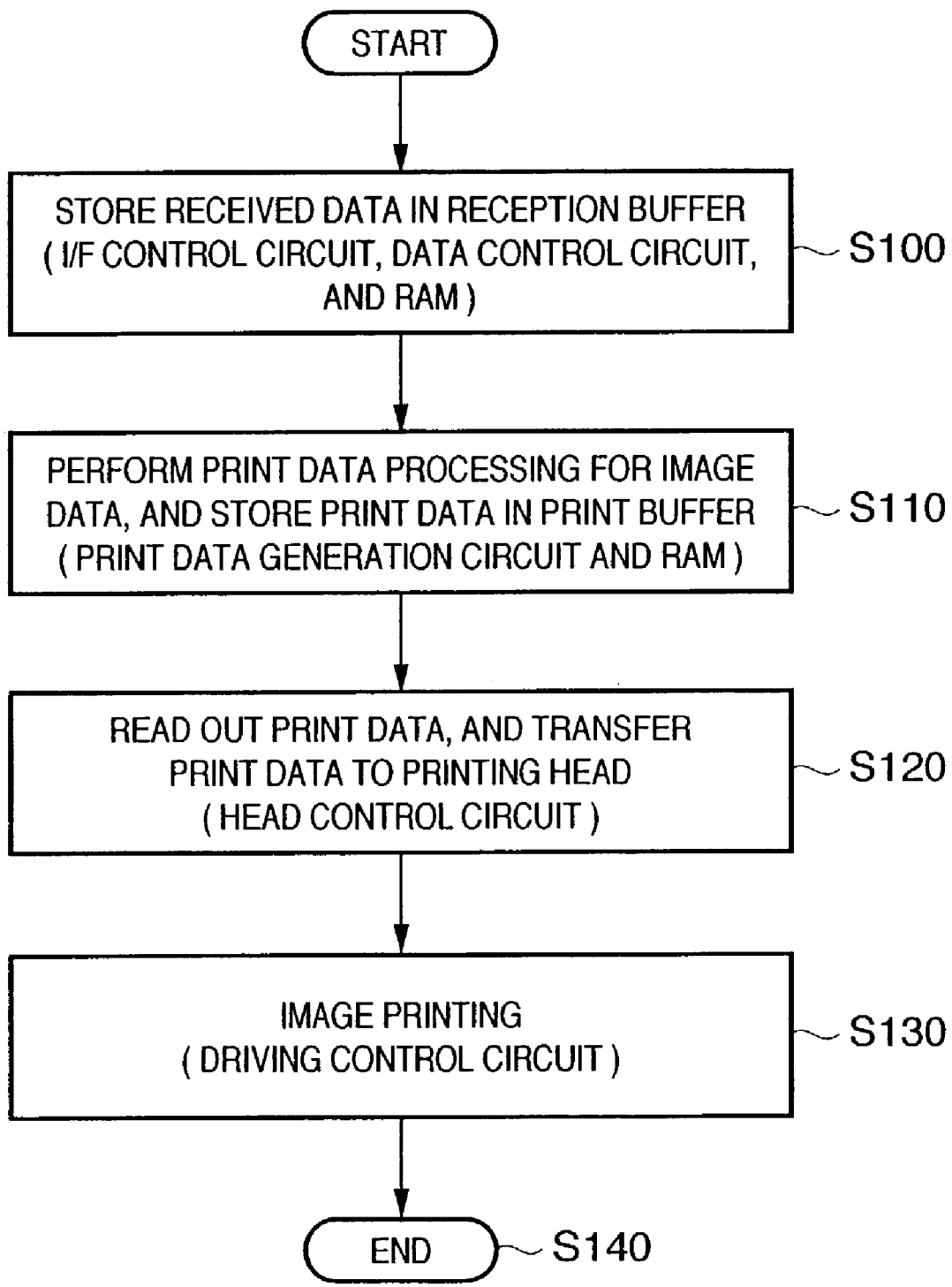

IMAGE PRINTING APPARATUS AND CONTROL METHOD THEREFOR

FIELD OF THE INVENTION

The present invention relates to an image printing apparatus and control method therefor and, more particularly, to an ink-jet image printing apparatus which discharges ink droplets onto a printing medium and forms an image, and a control method therefor.

BACKGROUND OF THE INVENTION

Recently, for print images, the dpi of printing apparatuses such as a printer which prints digital images is increasing along with the spread of personal computers, digital cameras, and the like. Of printing apparatuses, ink-jet printing apparatuses using an ink-jet printing head rapidly prevail. Demands arise for lower-cost ink-jet printing apparatuses which realize high-resolution images.

A serial scanning ink-jet printing apparatus prints an image by one scanning at the printing head width while scanning the printing head in a direction (main scanning direction) perpendicular to the convey direction (sub-scanning direction) of a printing medium such as a printing sheet. At the end of printing by one scanning, the ink-jet printing apparatus conveys the printing medium by the printing head width in the convey direction. The ink-jet printing apparatus sequentially repeats image printing by one scanning and conveyance of the printing medium described above, forming a desired image on the printing medium.

In a conventional printing apparatus, data sent from a host computer are data sequential in the main scanning direction (to be referred to as raster data hereinafter). To print an image by one scanning at the printing head width, data must be converted into data sequential in the sub-scanning direction (to be referred to as column data hereinafter) in accordance with the number of print elements (e.g., the number of ink discharge nozzles) of the printing head. To print an image by one scanning, the printing apparatus must hold at least a memory area for accumulating raster data by the number of discharge nozzles and a memory area for accumulating column data.

A higher image quality is required by increasing the dpi of the printing apparatus. A higher dpi of the printing apparatus increases the image resolution, resulting in a large data amount for image printing. The memory area necessary for the printing apparatus also increases, and an expensive large-capacity memory leads to high cost, inhibiting cost reduction of the printing apparatus.

A technique of reducing the memory area necessary for the printing apparatus is disclosed in Japanese Patent Laid-Open No. 11-259248. According to Japanese Patent Laid-Open No. 11-259248, isochronous data transfer is performed between a host computer and a printer by minimum buffering. This can reduce the memory capacity necessary for the printing apparatus.

More specifically, image data of one scanning is divided into data frames and transferred in isochronous data transfer between the host computer and the printer. When the printer receives image data transferred from the host computer, the printer processes the image data and temporarily holds it in the memory area of the printer. This memory area stores one or more divided data frames of image data during printing operation by one scanning.

In isochronous data transfer in which image data of one scanning is divided into data frames and transferred, data frames of image data of one scanning are successively transmitted to the memory area of the printer. The memory area size of the printer suffices to ensure at least a memory area capable of storing one or more data frames, and the memory area need not store image data of one scanning. Unlike a conventional printer, a memory area for storing image data of one scanning is not required.

In the above-described isochronous data transfer, printing operation by one scanning can start upon reception of minimum data necessary for image printing without storing image data of one scanning in the memory area of the printing apparatus. Sequentially transmitted data frames are stored in the memory area of the printer while the memory area is rewritten. An image by one scanning can be formed without interrupting scanning of the printing head, while the memory capacity necessary for the printing apparatus can be reduced.

In the above-described isochronous data transfer, a job and task in the host computer cannot be managed by the printing apparatus. Data transfer from the host computer to the printing apparatus may be left undone due to any reason.

If image printing is interrupted during one scanning, as described above, a difference (printing time difference) in the printing time on a printing medium is generated between a dot at the interrupted position and a dot at a restart position adjacent to the interrupted position. It is generally known that the density change caused by the printing time difference appears as density unevenness (printing time difference unevenness) in a printed image in the presence of the printing time difference. The reason is as follows.

Ink droplets landed on a printing medium permeate in a direction perpendicular to the printing medium (e.g., paper) (direction of thickness of the printing medium) and a direction in which ink droplets spread on the surface of the printing medium. A pigment such as a dye serving as an ink component is physically and chemically bonded with the printing medium.

If a time difference ($t_2-t_1$) between printing times ($t_1$ and $t_2$) when two adjacent dots are printed is small, ink droplets landed on the printing medium later ($t_2$) also permeate in the direction perpendicular to the printing medium and the direction in which ink droplets spread on the surface of the printing medium. However, these ink droplets hardly permeate and fix in a region where ink droplets landed earlier ($t_1$) fix.

This is because ink droplets landed earlier ($t_1$) are permeating yet, and the printing medium and ink component can be chemically bonded with each other by a limited amount. Thus, ink droplets landed later ($t_2$) permeate and fix below the region where ink droplets landed earlier ($t_1$) permeate.

If the time difference ($t_2-t_1$) between the printing times ($t_1$ and $t_2$) when two adjacent dots are printed is large, ink droplets landed later ($t_2$) permeate by a larger amount than ink droplets for the small time difference ($t_2-t_1$) in the region where ink droplets landed earlier ($t_1$) permeate and fix.

This is because ink droplets landed earlier ($t_1$) sufficiently permeate and spread, or the volatile component of ink droplets evaporates, the ink droplet amount per unit area decreases, and ink droplets landed later ($t_2$) spread and penetrate to the region of ink droplets landed earlier ($t_1$).

More specifically, if the time difference between printing times when adjacent dots are printed is large, ink, i.e., a pigment or ink component such as a dye fixed near the surface of the printing medium remains in a large amount. The density is related to light absorption of the pigment fixed near the surface of the printing medium, and a large printing time difference leads to a high density. If printing operation is interrupted during one scanning, density unevenness occurs in images printed before and after interruption, and the boundary between the images before and after interruption appears as a stripe, greatly degrading the image quality.

SUMMARY OF THE INVENTION

The present invention has been made to overcome the conventional drawbacks, and has as its object to provide an image printing apparatus and control method therefor which can suppress degradation of the image quality caused by a time difference when an image is to be printed using data transferred from a host computer, data transfer is left undone during image printing, and the printing time difference (interruption) is generated in image printing.

To achieve the above object, an image printing apparatus according to an aspect of the present invention has the following arrangement. That is, an image printing apparatus which prints an image by scanning on a printing medium in a main scanning direction a carriage holding a printing head having a plurality of nozzles comprises detection means for detecting that image printing is interrupted during image printing by one scanning, and control means for, when interruption is detected, controlling to extract part of image data printed before the interruption, print the remaining image data, and print the extracted part of the image data after the interruption.

For example, the image printing apparatus prints an image by scanning the carriage holding the printing head on a printing medium on the basis of image data received from a host apparatus for each of data frames obtained by dividing, by an arbitrary division count, image data necessary to print an image by one scanning at a width corresponding to the number of nozzles of the printing head.

For example, the detection means preferably determines that image printing is interrupted when a time until a next data frame is received after a data frame is received exceeds a predetermined time.

For example, the control means preferably controls to extract part of image data contained in a data frame finally received before detection of the interruption, add the extracted part of the image data to the start of a data frame first received after detection of the interruption, and print the added start of the data frame in the same region as a region of a data frame finally printed before the interruption.

For example, the image printing apparatus preferably further comprises generation means for generating print data from image data contained in the received data frame.

For example, the detection means compares a received data frame amount and a print data amount, and when generation of the print data does not catch up with image printing, determines that image printing is interrupted.

For example, the printing head preferably includes an ink-jet printing head which discharges ink to perform printing.

For example, the printing head preferably includes a printing head which discharges ink by using heat energy, and has an electrothermal transducer which generates heat energy to be applied to the ink.

To achieve the above object, an image printing apparatus control method according to another aspect of the present invention has the following steps. That is, a method of controlling an image printing apparatus which prints an image by scanning on a printing medium in a main scanning direction a carriage holding a printing head having a plurality of nozzles comprises a detection step of detecting that image printing is interrupted during image printing by one scanning, and a control step of, when interruption is detected, controlling to extract part of image data printed before the interruption, print the remaining image data, and print the extracted part of the image data after the interruption.

To achieve the above object, a control program of controlling an image printing apparatus according to still another aspect of the present invention has the following program codes. That is, a control program of controlling an image printing apparatus which prints an image by scanning on a printing medium in a main scanning direction a carriage holding a printing head having a plurality of nozzles comprises a program code for a detection step of detecting that image printing is interrupted during image printing by one scanning, and a program code for a control step of, when interruption is detected, controlling to extract part of image data printed before the interruption, print the remaining image data, and print the extracted part of the image data after the interruption.

To achieve the above object, a computer-readable storage medium which stores a control program of controlling an image printing apparatus according to still another aspect of the present invention has the following program codes. That is, a computer-readable storage medium stores a control program of controlling an image printing apparatus which prints an image by scanning on a printing medium in a main scanning direction a carriage holding a printing head having a plurality of nozzles, the control program comprising a program code for a detection step of detecting that image printing is interrupted during image printing by one scanning, and a program code for a control step of, when interruption is detected, controlling to extract part of image data printed before the interruption, print the remaining image data, and print the extracted part of the image data after the interruption.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are schematic views showing an example of an image printed on a printing medium when isochronous data transfer is left undone during image printing and a printing time difference is generated in image printing.

FIGS. 4A and 4B are schematic views showing an example of an image printed on a printing medium according to the embodiment of the present invention when isochronous data transfer is left undone during image printing and a printing time difference is generated in image printing;

FIGS. 6A to 6C are views for explaining processing of generating two overlapping data $c_1$ and $c_2$ from the final data frame transmitted immediately before generation of a time delay according to the embodiment of the present invention;

FIGS. 7A to 7D are views for explaining processing of adding the second overlapping data $c_2$ to the first data frame transmitted immediately after generation of a time delay according to the embodiment of the present invention;

FIG. 8 is a flow chart for explaining image printing processing of the ink-jet printer according to the embodiment of the present invention;

FIG. 9B is a view showing an example of storing the second overlapping data $c_2$ in a data frame 405a;

DETAILED DESCRIPTION OF THE PREFERRED EMBODIMENTS

Preferred embodiments of the present invention will now be described in detail in accordance with the accompanying drawings.

The following embodiments will exemplify an ink-jet printer using an ink-jet printing method as an image printing apparatus, and a personal computer as a host apparatus which transmits image printing data to the image printing apparatus. However, the spirit and scope of the present invention are not limited to the following examples.

In this specification, "printing" (to be also referred to as "drawing" or "print") is to form an image, design, pattern, or the like on a printing medium or process a medium regardless of whether to form significant information such as a character or figure, whether information is significant or insignificant, or whether information is so visualized as to allow a user to visually perceive it.

"Printing media" are not only paper used in a general printing apparatus, but also ink-receivable materials such as cloth, plastic film, metal plate, glass, ceramics, wood, and leather.

"Ink" (to be also referred to as "liquid") should be interpreted as widely as the definition of "printing (drawing) ". "Ink" represents a liquid which is applied to a printing medium to form an image, design, pattern, or the like, process the printing medium, or contribute to ink processing (e.g., solidification or insolubilization of a coloring material in ink applied to a printing medium).

Brief Description of a Printing Apparatus

Figure 10:
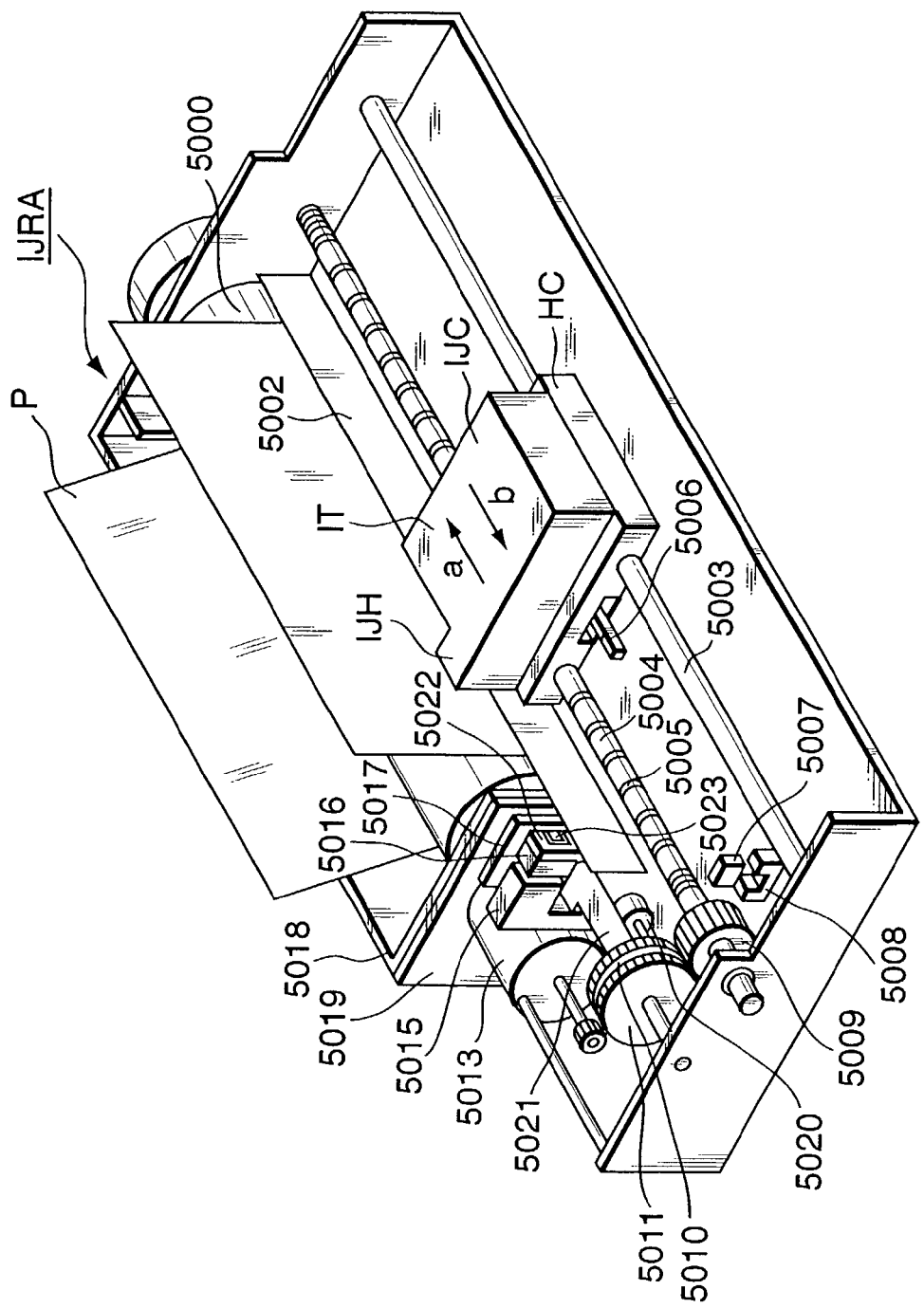
FIG. 10 is a perspective view showing the control arrangement of the ink-jet printer according to the embodiment of the present invention.

FIG. 10 is a perspective view showing the outer appearance of an ink-jet printer IJRA as a typical embodiment of the present invention. Referring to FIG. 10, a carriage HC engages with a spiral groove 5004 of a lead screw 5005, which rotates via driving force transmission gears 5009 to 5011 upon forward/reverse rotation of a drive motor 5013. The carriage HC has a pin (not shown), and is reciprocally moved in directions of arrows a and b in FIG. 10. An integrated ink-jet cartridge IJC which incorporates a printing head IJH and an ink tank IT is mounted on the carriage HC.

Reference numeral 5002 denotes a sheet pressing plate, which presses a paper sheet against a platen 5000, ranging from one end to the other end of the scanning path of the carriage. Reference numerals 5007 and 5008 denote photo-couplers which serve as a home position detector for recognizing the presence of a lever 5006 of the carriage in a corresponding region, and used for switching, e.g., the rotating direction of motor 5013.

Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment.

Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

Ink Cartridge

Note that the ink tank IT and the printing head IJH are integrally formed to construct an exchangeable ink cartridge IJC, however, the ink tank IT and the printing head IJH may be separately formed such that when ink is exhausted, only the ink tank IT can be exchanged for new ink tank.

Figure 11:
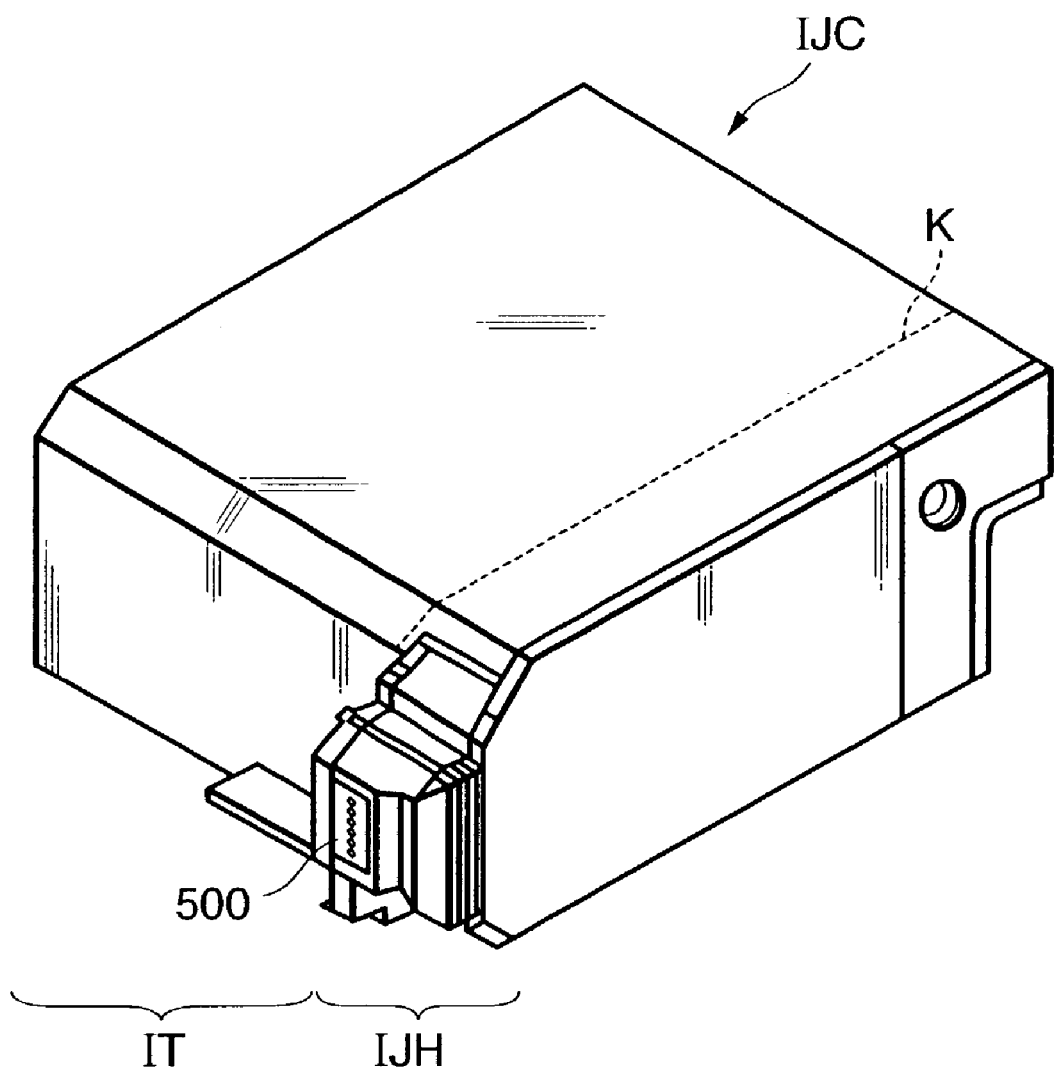
FIG. 11 is a perspective view showing the outer appearance of an ink cartridge.

FIG. 11 is a perspective view showing the structure of the ink cartridge IJC where the ink tank and the head can be separated. As shown in FIG. 11 in the ink cartridge ITC, the ink tank IT and the printing head IJH can be separated along a line K. The ink cartridge IJC has an electrode (not shown) for receiving an electric signal supplied from the carriage HC side when it is mounted on the carriage HC. By the electric signal, the printing head IJH is driven as above, and discharges ink.

Note that in FIG. 11, numeral 500 denotes an ink-discharge orifice array. Further, the ink tank IT has a fiber or porous ink absorbing body. The ink is held by the ink absorbing body.

First, interrupting and restarting image printing operation, in the case that data transfer from the host computer to the above described inkjet printer is left undone, will be explained.

If data transfer from the host computer to the printing apparatus is left undone (data transfer does not catch up with image printing) after the start of printing operation by one scanning, the printing apparatus cannot print any image by the printing head. At this time, the printing head must stop at the position until the next image data is received, or must return to the home position (reference position) and wait until image data is stored in the memory area. After a sufficient amount of image data is stored in the memory area, the printing head is scanned again. The printing apparatus restarts printing from the position where printing stops due to the interruption of data transfer from the host computer, and completes image printing by one scanning.

[Image Quality when Data Transfer is Left Undone (FIGS. 3A and 3B)]

Degradation of the image quality when data transfer from the host computer to the printing medium is left undone and the image printing operation is interrupted and restarted, as described above, will be explained in detail with reference to FIGS. 3A and 3B.

In FIG. 3A, image data of one scanning is divided into n data frames. Data frames of image data of one scanning transmitted from the host computer to the printing apparatus are transmitted in an order of 301, 302, . . . , 30n in FIG. 3A. The printing apparatus starts printing an image by one scanning at the printing head width upon reception of data up to, e.g., the data frame 303.

At this time, an image is printed sequentially from the data frame 301 on a printing medium, as shown in FIG. 3B. Image data accumulated in the memory area is decreased with the progress of image printing. Data frames sequentially transmitted from the host computer are stored in the memory area while the contents of the memory area of the printing apparatus are sequentially rewritten.

A case wherein data transfer from the host computer is left undone when the printing apparatus receives the data frames up to the data frame 305 in FIG. 3A will be explained.

If data transfer from the host computer is left undone when the printing apparatus receives the data frames up to the data frame 305, the printing apparatus interrupts image printing operation at the end of image printing using the data frame 305, stops the printing head at the current position or returns the printing head to the reference position, and waits until data is transferred again from the host computer. After data transfer from the host computer restarts and image data of the data frame 306 and subsequent data frames are accumulated by a necessary amount in the memory area of the printing apparatus, the printing apparatus restarts image printing from the interrupted position.

As shown in FIG. 3B, density unevenness occurs between dots (landed ink droplets) printed near the boundary between images 305 and 306 printed using the data frames 305 and 306 which have a time difference (interruption) in printing time due to the interruption of data transfer from the host computer. This unevenness is recognized as a stripe near the boundary between the images 305 and 306. The stripe greatly degrades the image quality.

The method to reduce the degradation of the image quality as above described is as follows.

Figure 1:
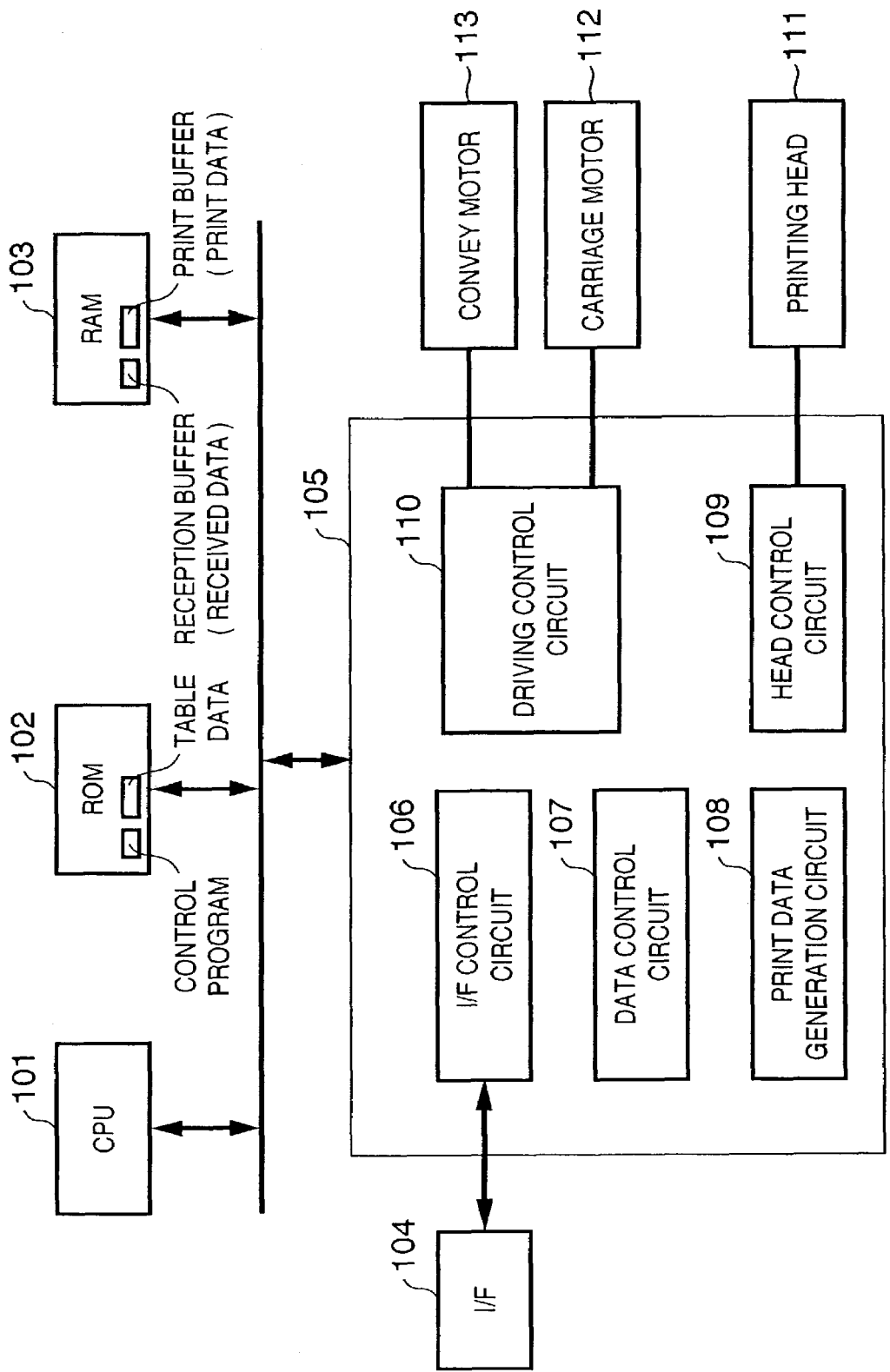
FIG. 1 is a block diagram showing the schematic arrangement of an ink-jet printer according to an embodiment of the present invention.

Control Arrangement of Ink-Jet Printer: FIG. 1

FIG. 1 is a block diagram showing a control arrangement of an ink-jet printer.

In FIG. 1, reference numeral 101 denotes a CPU; 102, a ROM which stores a control program to be executed by the CPU 101, other table data, and the like; and 103, a RAM used as areas such as a reception buffer which stores data received from a host computer (not shown) via an interface 104, and a print buffer which stores print data generated by a print data generation circuit 108 to be described later.

Reference numeral 105 denotes an ASIC serving as the controller of an ink-jet printer. The ASIC 105 comprises an interface control circuit 106 which exchanges data with the host computer (not shown) via the interface 104, a data control circuit 107 which controls read/write of data from/in the reception buffer and print buffer within the RAM 103, the print data generation circuit 108 which generates print data according to the embodiment, a head control circuit 109 which controls data transfer of generated print data to a printing head 111 and discharge of ink from the printing head, and a driving control circuit 110 which controls driving of a carriage motor 112 for scanning a carriage holding the printing head 111 and a convey motor 113 for supplying and discharging a printing medium.

Image Printing Operation of Ink-Jet Printer: FIG. 8

Image printing operation performed while the CPU 101 controls respective parts on the basis of a control program stored in the ROM 102 will be explained with reference to FIG. 8.

In step S100, data containing image data is received from the host computer (not shown) via the interface 104 in FIG. 1. The data control circuit 107 in the ASIC 105 temporarily stores the received data in the reception buffer allocated in the RAM 103 via the interface control circuit 106.

In step S110, the print data generation circuit 108 analyzes the command of the received data stored in the reception buffer, and performs print data processing for the image data contained in the received data. The generated print data is accumulated in the print buffer allocated in the RAM 103.

In step S120, after a necessary amount of print data is accumulated in the print buffer, the head control circuit 109 reads out the print data from the print buffer at a predetermined timing, and transfers the print data to the printing head 111.

In step S130, the driving control circuit 110 is controlled to drive the carriage motor 112. The printing head 111 is scanned in a direction (main scanning direction) perpendicular to the convey direction (sub-scanning direction) of a printing medium such as a printing sheet. The head control circuit 109 is controlled to supply a driving pulse to the printing head 111. An image is printed on the printing medium, completing image printing by the printing head width. At the end of image printing by one scanning, the driving control circuit 110 is controlled to drive the convey motor 113. The printing medium is conveyed in the convey direction by the printing head width.

Processing when Data Transfer is Left Undone: FIGS. 2, 9A, 9B, and 4A to 7D

Processing by the print data generation circuit 108 when data transfer from the host computer (not shown) to the ink-jet printer is left undone during the above-described image printing operation will be explained with reference to FIGS. 2, 9A, 9B, and 4A to 7D.

Figure 2:
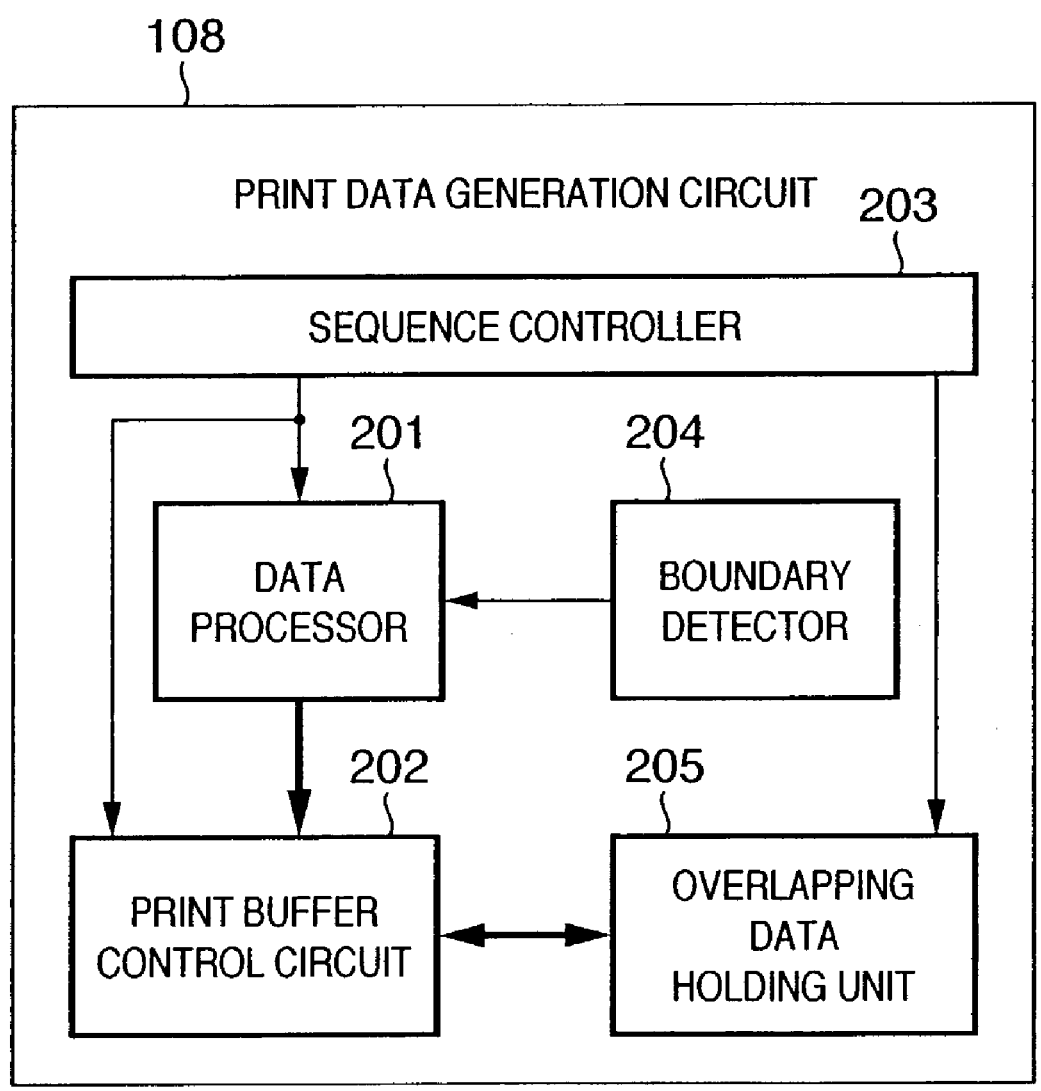
FIG. 2 is a block diagram showing a print data generation circuit according to the present invention.

(Print Data Generation Circuit: FIG. 2)

FIG. 2 is a block diagram showing the print data generation circuit 108. Reference numeral 201 denotes a data processor which generates image data to be written in the print buffer; 202, a print buffer controller which controls a write address or the like to the print buffer; and 203, a sequence controller which controls the overall print data generation circuit 108 and determines whether generation of print data catches up with image printing.

For example, when the time between reception of a data frame (final data frame transmitted immediately before generation of a time delay) and reception of the next data frame (data frame first transmitted after generation of the time delay) exceeds a predetermined time set in advance, images printed by these data frames are determined to have a time delay.

It is also possible to compare a received data amount and print data amount which are accumulated in the RAM 103 and determine on the basis of the comparison result whether generation of print data catches up with image printing.

Reference numeral 204 denotes a boundary detector which, when data transfer from the host computer (not shown) is left undone and a time difference is generated in image printing, detects the boundary (e.g., between 405 and 406 in FIG. 4A) between two data frames having the time difference (a final data frame transmitted immediately before generation of the time delay and a data frame first transmitted after generation of the time delay), and when the time difference is generated at the boundary between the data frames, manages a data overlapping portion to be described later.

Reference numeral 205 denotes an overlapping data holding unit which holds part of overlapping data generated by overlapping data processing to be described later for data frames having a time difference. Part of overlapping data held by the overlapping data holding unit 205 is added to the start of a data frame first transmitted after generation of a time delay. Note that overlapping data is data which is processed by dividing original data into two groups in order to print an image in two operations.

Figure 9A:
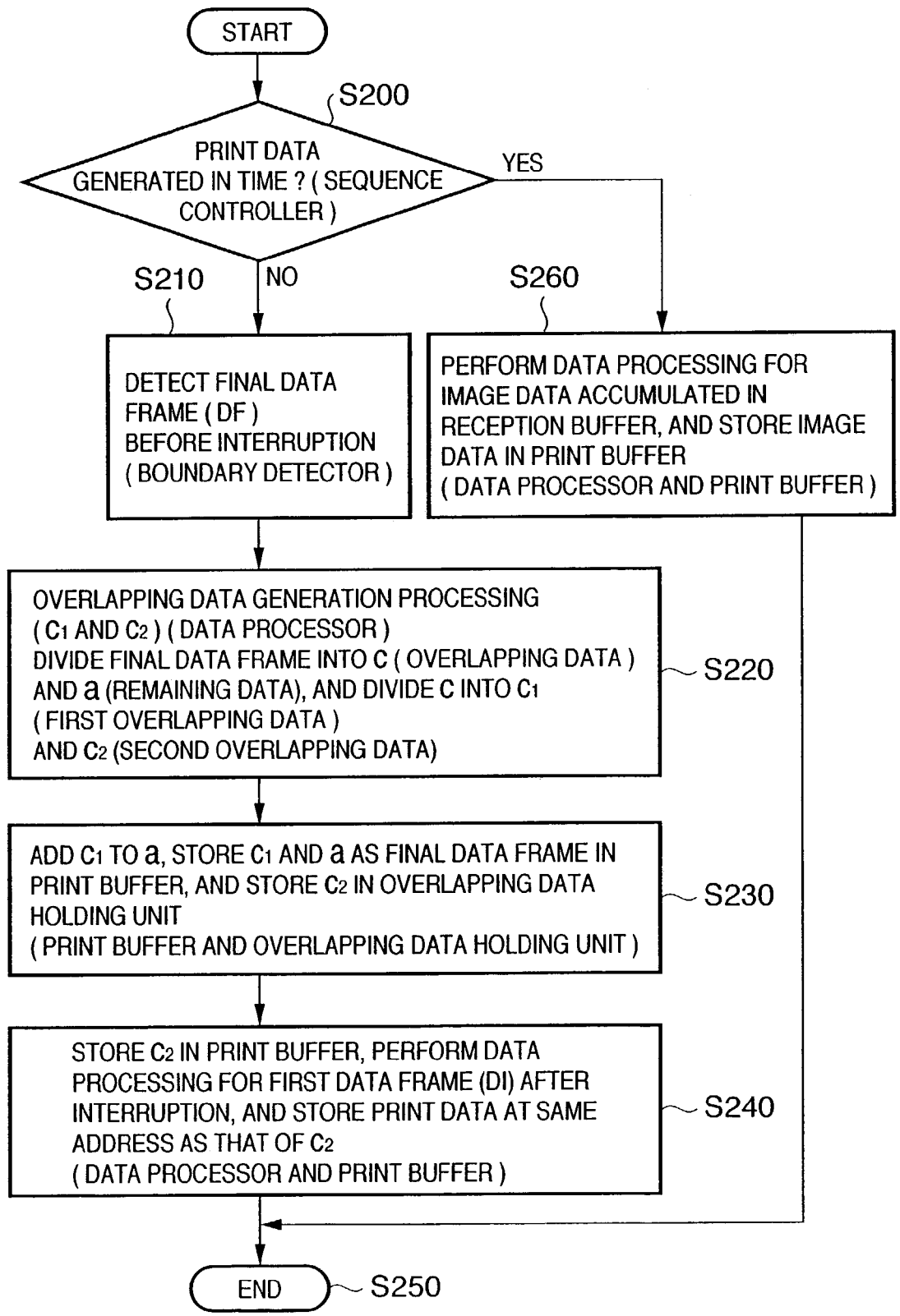
FIG. 9A is a flow chart for explaining overlapping data generation processing according to the embodiment of the present invention.

(Processing by Print Data Generation Circuit: FIG. 9A)

FIG. 9A shows processing by the print data generation circuit 108.

In step S200, the sequence controller 203 compares a received data amount accumulated in the reception buffer within the RAM 103 and a print data amount accumulated in the print buffer. The sequence controller 203 determines whether generation of print data necessary to continue image printing operation by one scanning catches up with image printing.

If generation of print data is determined to catch up with image printing (YES in step S200), the processing advances to step S260. The data processor 201 performs data processing for image data contained in received data accumulated in the reception buffer, generates print data, and stores the print data in the print buffer. The processing advances to step S250 to end a series of operations.

If NO in step S200, the processing advances to step S210. The boundary detector 204 detects the final data frame (DF) transmitted before interruption of image printing (immediately before generation of a time delay).

The processing advances to step S220. The data processor 201 executes overlapping data generation processing on the basis of the final data frame (DF) transmitted immediately before generation of the time delay. That is, the data processor 201 divides the final data frame (DF) into two data c (overlapping data) and a (data other than overlapping data). The data processor 201 further divides c (overlapping data) into $c_1$ (first overlapping data) and $c_2$ (second overlapping data), thus generating print data containing the two overlapping data $c_1$ and $c_2$. The data frame is divided into a and c as follows. For example, when the number of columns contained in one data frame is 600, a is assigned 500 and c is assigned 100 (i.e., the data frame is divided into a:c=5:1). This data frame division method is merely an example, and the data frame can be arbitrarily divided as far as density nonuniformity is inconspicuous. Note that the first and second overlapping data $c_1$ and $c_2$ are obtained by dividing the overlapping data c into two by an arbitrary division method. The data $c_1$ and $c_2$ complement each other, and the sum of $c_1$ and $c_2$ is equal to $c(c=c_1+c_2)$. The sum of image regions printed by $c_1$ and $c_2$ is equal in size to an image region printed by c. An image printed by superposing $c_1$ and $c_2$ is identical to an image printed by c (see FIGS. 6A to 6C). For example, $c_1$ is data corresponding to odd-numbered nozzles, and $c_2$ is data corresponding to even-numbered nozzles. Alternatively, $c_2$ may be sampled from c in a zigzag pattern.

The processing advances to step S230. Of the two overlapping data $c_1$ and $c_2$ generated by overlapping data generation processing, the first overlapping data $c_1$ is stored in the print buffer together with a (data other than overlapping data) of the final data frame (DF) transmitted immediately before generation of the time delay. The second overlapping data $c_2$ is held by the overlapping data holding unit 205.

Figure 9B:
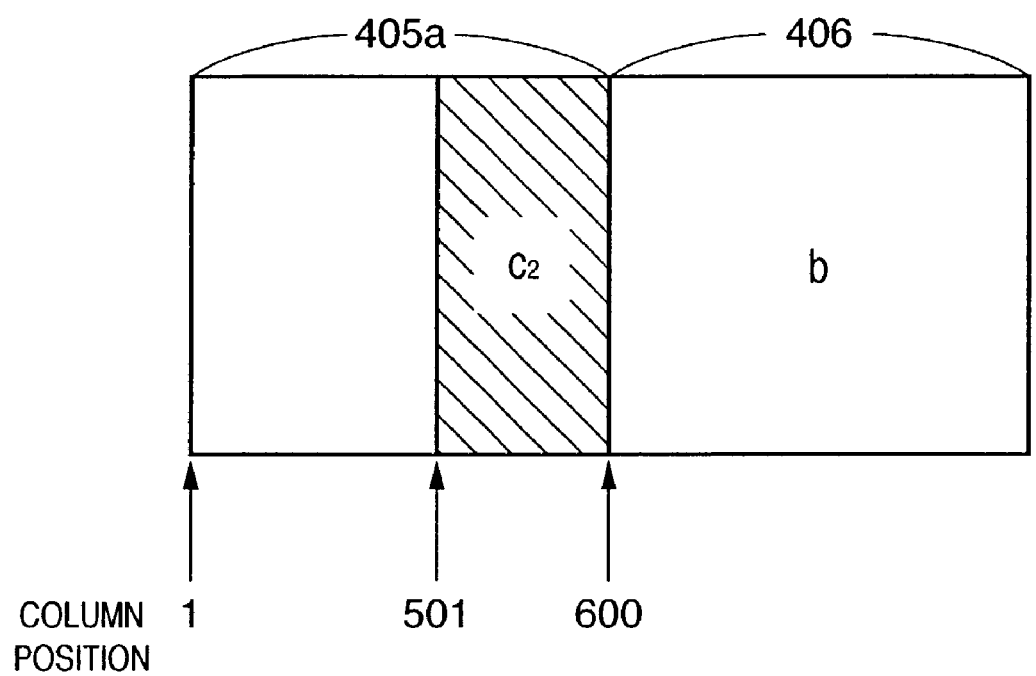

The processing advances to step S240. The print buffer control circuit 202 stores in the print buffer the second overlapping data $c_2$ held by the overlapping data holding unit 205. The print buffer control circuit 202 performs data processing for image data of a data frame (DI) first transmitted after generation of the time delay, thereby generating print data. The print buffer control circuit 202 stores the print data in the print buffer at an address subsequent to an address at which the second overlapping data $c_2$ is stored (i.e., adds $c_2$ to the start of DI). The processing advances to step S280 to end a series of operations. Note that the method of storing the second overlapping data $c_2$ in the print buffer is merely an example, and only $c_2$ may be stored. For example, assume that the data frame 405 is the final data frame transmitted immediately before generation of a time delay, and the data frame 406 is a data frame first transmitted after generation of the time delay. As shown in FIG. 9B, a data frame 405a where only $c_2$ is stored is ensured subsequently to the data frame 405. In the data frame 405a, $c_2$ is stored at the same column position as that of $c_1$. For example, if $c_1$ is stored at column positions 501 to 600 in the data frame 405, $c_2$ is stored at column positions 501 to 600 in the data frame 405a, and null data are stored at column positions 1 to 500, as shown in FIG. 9B.

(Image Printing Processing: FIGS. 4A to 7D)

Processing by the print data generation circuit 108 will be described in detail below with reference to FIGS. 4A to 7D.

FIG. 4A shows an example of data transfer from the host computer (not shown) to the ink-jet printer. Image data of one scanning is divided into n data frames, and transmitted as data frames 401, 402, . . . , 40n. Data received by the ink-jet printer is temporarily stored in the reception buffer allocated within the RAM 103. For example, when the scanning/printing width is 8 inches and n is 8, the frame length corresponding to the main scanning direction is 1 inch.

The print data generation circuit 108 uses the data processor 201 to process image data contained in the received data accumulated in the reception buffer, thus generating print data. The print data generation circuit 108 writes the print data sequentially from the data frame 401 in the print buffer within the RAM 103.

For example, image printing by one scanning with the printing head width starts when data up to the data frame 402 are stored in the print buffer. As shown in FIG. 4B, an image is printed sequentially from the data frame 401 on a printing medium. Image data accumulated in the memory area is decreased with the progress of image printing. Data frames sequentially transmitted from the host computer are stored in the memory area while the contents of the memory area of the ink-jet printer are sequentially rewritten.

Processing by the print data generation circuit 108 when the ink-jet printer receives the data frames up to the data frame 405 in FIG. 4A and then data transfer from the host computer (not shown) is left undone will be explained.

If data transfer from the host computer (not shown) is left undone upon reception of the data frames up to the data frame 405 in FIG. 4A and the data frame 406 cannot be received, generation of print data from the data frame 406 does not catch up with image printing though actual printing operation progresses. The sequence controller 203 determines that a time difference in printing time is generated between images printed by the data frames 405 and 406.

If the sequence controller 203 detects that the time difference (interruption) is generated at the boundary between the received data frames 405 and 406, the data processor 201 executes for the data frames 405 and 406 the following processing of generating overlapping data. Note that the following overlapping data generation is performed only when a time difference is generated between received data frames.

Figure 5:
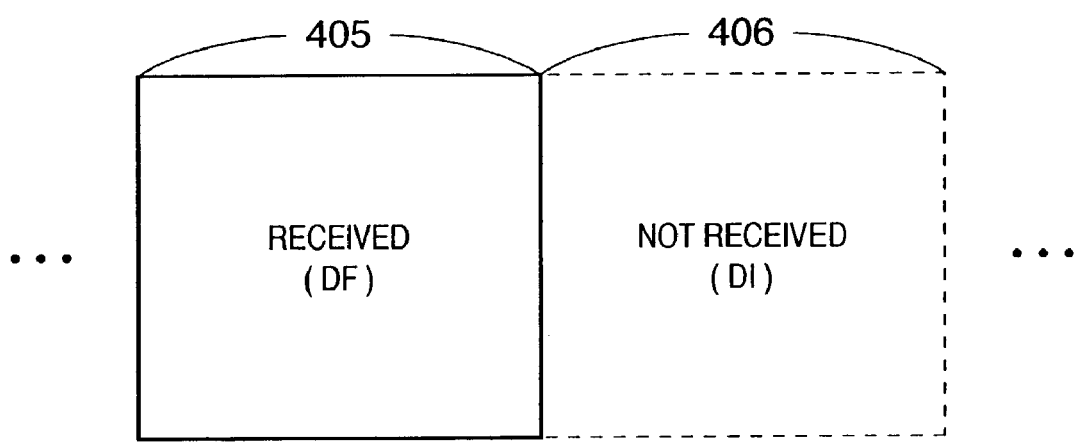
FIG. 5 is a view showing the final data frame transmitted immediately before generation of a time delay and a data frame first transmitted after generation of the time delay.

FIG. 5 shows a state in which transmission of the data frame 406 from the host computer (not shown) is left undone upon reception of the data frames up to the data frame 405 and the sequence controller 203 determines that data transfer is left undone. That is, the data frame 405 is the final data frame (DF) transmitted immediately before generation of a time delay. The data frame 406 is a data frame (DI) first transmitted after generation of the time delay.

At this time, as shown in FIG. 6A, the data processor 201 divides data of the data frame 405 serving as the final data frame (DF) into two data c (overlapping data) and a (data other than overlapping data). As shown in FIG. 6B, the data processor 201 further divides c (overlapping data) into $c_1$ (first overlapping data) and $c_2$ (second overlapping data), thus, generating two overlapping data ($c_1$ and $c_2$).

As shown in FIG. 6C, the data processor 201 extracts only the second overlapping data $c_2$ from the data frame 405. That is, the data processor 201 stores data a other than overlapping data in the print buffer, stores the first overlapping data $c_1$ at the same address in the print buffer, and stores the extracted second overlapping data $c_2$ in the overlapping data holding unit 205.

Note that an image immediately before generation of the time delay is printed using the data frame 405 ($a+c_1$) obtained by extracting the second overlapping data $c_2$ from the data frame 405 and performing overlapping data processing. When the image up to the data frame 405 is formed on a printing medium, the printing head interrupts printing operation and returns to the reference position.

After data transfer from the host computer (not shown) restarts and data of the data frame 406 and subsequent data frames are received, the data processor 201 starts processing the data frame 406.

When the data frame (DI), i.e., data frame 406 first transmitted after generation of the time delay is received, as shown in FIG. 7A, the data processor 201 adds the second overlapping data $c_2$ extracted from the data frame 405 to the start of the data frame 406, as shown in FIG. 7B.

More specifically, upon reception of the data frame 406, the data processor 201 writes the second overlapping data $c_2$ held by the overlapping data holding unit 205 at an address represented by the print buffer controller 202. The data processor 201 performs data processing for image data of the received data frame 406, generating print data. The data processor 201 writes the print data at an address subsequent to an address at which the second overlapping data $c_2$ is written. As a result, the second overlapping data $c_2$ is added to the start of the data frame 406. An image immediately after generation of the time delay is printed using the data frame 406 containing the second overlapping data $c_2$.

Note that printing/scanning restarts when a necessary amount of print data of the data frame 406 containing the second overlapping data $c_2$ and subsequent data frames are accumulated in the print buffer. Actual printing operation starts from an interrupted position.

At this time, as shown in FIG. 7C, a dot portion ($c_1$) printed before interruption and a dot portion ($c_2$) printed after restart coexist by the above-described overlapping data processing at a portion c serving as the boundary between images printed by the data frames 405 and 406. Accordingly, density unevenness by the time difference of dot printing can be reduced, a conventionally undesirable stripe can be prevented, and a high-quality image can be provided.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal.

By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In this case, as described in Japanese Patent laid Open No. 54-56847 or Japanese Patent Laid Open No. 60-71260, an ink may be supplied in a form of perforated sheet opposed to the electrothermal transducer in which the ink is maintained in liquid or solid within a dent or a through-hole thereon. In the present invention, the above-mentioned film boiling system is most effective for the above-mentioned inks.

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program. In this case, the program code read from the storage medium realize the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, additional functions according to the above embodiments are realized by executing the program code which are read by a computer. The present invention includes a case where an OS (operating system) or the like working on the computer performs a part or entire process in accordance with designations of the program code and realizes functions according to the above embodiments.

Furthermore, the present invention also includes a case where, after the program code read from the storage medium are written in a function expansion card which is inserted into the computer or in a memory provided in a function expansion unit which is connected to the computer, a CPU or the like contained in the function expansion card or function expansion unit performs a part or entire process in accordance with designations of the program code and realizes functions of the above embodiments.

In the case where the present invention is provided in the form of the above storage medium, the storage medium stores program code corresponding to the above mentioned flow charts (FIG. 8 and FIG. 9).

As described above, the ink-jet printer according to the embodiment detects that a time difference is generated in image formation of divided data frames of image data which is obtained by dividing, by an arbitrary division count, data of one scanning by a width corresponding to the number of nozzles of the printing head and is sent from the host computer. The ink-jet printer generates overlapping data between the data frames having the time difference.

Dots having the time difference can be formed by the generated overlapping data at the boundary between the data frames having the time difference. Density unevenness by the time difference can be reduced, and image degradation can be prevented.

As has been described above, the present invention can provide an image printing apparatus and control method therefor which can suppress degradation of the image quality caused by a time difference when an image is to be printed using data transferred from the host computer, data transfer is left undone during image printing, and the printing time difference is generated in image printing.

As many apparently widely different embodiments of the present invention can be made without departing from the spirit and scope thereof, it is to be understood that the invention is not limited to the specific embodiments thereof except as defined in the claims.

What is claimed is:

1. An image printing apparatus which prints an image by scanning on a printing medium in a main scanning direction a carriage holding a printing head having a plurality of nozzles, comprising:
   detection means for detecting that image printing is interrupted during image printing by one scanning of the carriage; and
   control means for, when interruption is detected, controlling to divide image data recieved before the interrution but not printed into first image data and second image data, to partially print a first image on a current scanning area using the first image data, and to interrupt printing, and, when the interrupted printing is restarted, to print a second image on the current scanning area using the second image data so as to fill the current scanning area in which the first image has been printed before the printing interruption with the second image,
   wherein the control means controls to hold the second image data contained in a data frame received before detection of the interruption, and before printing of a data frame first received before detection of the interruption, print the second image using the held second image data of the data frame in the same scanning area as the scanning area in which the first image has been finally printed before the interruption using the first image data.

2. The apparatus according to claim 1, wherein the image printing apparatus prints an image by scanning the carriage holding the printing head on a printing medium on the basis of image data received from a host apparatus for each of data frames obtained by dividing, by an arbitrary division count, image data necessary to print an image by one scanning at a width corresponding to the number of nozzles of the printing head.

3. The apparatus according to claim 1, wherein said detection means determines that image printing is interrupted when a time until a next data frame is received after a data frame is received exceeds a predetermined time.

4. The apparatus according to claim 2, further comprising generation means for generating print data from image data contained in the received data frame.

5. The apparatus according to claim 4, wherein said detection means compares a received data frame amount and a print data amount, and when generation of the print data does not catch up with image printing, determines that image printing is interrupted.

6. The apparatus according to claim 1, wherein the printing head includes an ink-jet printing head which discharges ink to perform printing.

7. The apparatus according to claim 6, wherein the printing head includes a printing head which discharges ink by using heat energy, and has an electrothermal transducer which generates heat energy to be applied to the ink.

8. A method of controlling an image printing apparatus which prints an image by scanning on a printing medium in a main scanning direction a carriage holding a printing head having a plurality of nozzles, comprising:
   a detection step of detecting that image printing is interrupted during image printing by one scanning of the carriage; and
   a control step of, when interruption is detected, controlling to divide image data received before the interruption but not printed into first image data and second image data, to partially print a first image on a current scanning area using the first image data, and to interrupt printing, and, when the interrupted printing is restarted, to print a second image on the current scanning area using the second image data so as to fill the current scanning area in which the first image has been printed before the printing interruption with the second image,
   wherein the control step controls to hold the second image data contained in a data frame received before detection of the interruption, and before printing of a data frame first received after detection of the interruption, print the second image using the held second image data of the data frame in the same scanning area as the scanning area in which the first image has been finally printed before the interruption using the first image data.

9. A computer-readable recording medium which stores a control program of controlling an image printing apparatus which prints an image by scanning on a printing medium in a main scanning direction a carriage holding a printing head having a plurality of nozzles, the control program comprising:
   a program code for a detection step of detecting that image printing is interrupted during image printing by one scanning of the carriage; and
   a program code for a control step of, when interruption is detected, controlling to divide image data received before the interruption but not printed into first image data and second image data, to partially print a first image on a current scanning area using the first image data, and to interupt printing, and, when the interrupted printing is restarted, to print a second image on the current scanning area using the second image data so as to fill the current scanning area in which the first image has been printed before the printing interruption with the second image,
   wherein the control step controls to hold the second image data contained in a data frame received before detection of the interruption, and before printing of a data frame first received after detection of the interruption, print the second image using the held second image data of the data frame in the same scanning area as the scanning area in which the first image has been finally printed before the interruption using the first image data.

10. The apparatus according to claim 2, wherein, when the interruption is detected by said detecton means, said control means controls to move the printing head to a predetermined position and to wait until a next data frame is received.

11. The apparatus according to claim 2, wherein the data frames are divided into first data positioned upstream in the main scanning direction and second data positioned downstream in the main scanning direction, and the second data is divided into two data, the two data are complements to each other, and then one of the two data of the second data is stored in a storing means to print after the interrution.

12. The apparatus according to claim 2, wherein said detection means detects an occurrence of the interruption of the image printing, when the data frame reception does not catch up with image printing operation using the printing head.

13. An image printing apparatus which prints an image by scanning on a printing medium in a main scanning direction a carriage holding a printing head having a plurality of nozzels, comprising:
   receiving means for receiving image data with a printing width corresponding to the plurality of nozzles provided at the printing head, transmitted from a host apparatus that is connected to the outside;
   printing means for printing the image by the printing head during scanning of the carriage based on the image data received by the receiving means;
   detection means for detecting that image printing is interrupted during one scanning of the carriage in the main scanning direction by the printing means; and
   control means for, when interrution during one scanning in the main scanning direction is detected by the detection means, controlling to divide image data received before the interruption but not printed into first image data and second image data, to partially print a first image on a current scanning area using the first image data, and to interupt printing, and, when the interrupted printing is restarted, to print a second image on the current scanning area using the second image data so as to fill the current scanning area in which the first image has been printed before the printing interruption with the second image,
   wherein the control step controls to hold the second image data contained in a data frame received before detection of the interruption, and before printing of a data frame first received after detection of the interruption, print the second image using the held second image data of the data frame in the same scanning area as the scanning area in which the first image has been finally printed before the interruption using the first image data.

14. A method of controlling an image printing apparatus which includes receiving means for receiving image data, with a printing width corresponding to a plurality of nozzles provided at a printing head, transmitted from a host apparatus that is connected to outside and printing means for printing an image by the printing head during scanning of a carriage based on the image data received by the receiving means, and which prints the image by scanning on a printing medium in a main scanning direction the carriage holding the printing head having the plurality of nozzels, comprising:

a detection step of detecting that image printing is interrupted during one scanning of the carriage in the main scanning direction by the printing means; and a control step of, when interruption during one scanning in the main scanning direction is detected by the detection step, controlling to divide image data received before the interruption but not printed into first image data and second image data, to partially print a first image on a current scanning area using the first image data, and to interupt printing, and, when the interrupted printing is restarted, to print a second image on the current scanning area using the second image data so as to fill the current scanning area in which the first image has been printed before the printng interruption with the second image, wherein the control step controls to hold the second image data contained in a data frame received before detection of the interruption, and before printing of a data frame first received after detection of the interruption, print the second image using the held second image data of the data frame in the same scanning area as the scanning area in which the first image has been finally printed before the interruption using the first image data.

* * * * *

UNITED STATES PATENT AND TRADEMARK OFFICE
CERTIFICATE OF CORRECTION

| | |
|---|---|
| PATENT NO. | : 7,359,073 B2 |
| APPLICATION NO. | : 10/410301 |
| DATED | : April 15, 2008 |
| INVENTOR(S) | : Hiroshi Uemura |

It is certified that error appears in the above-identified patent and that said Letters Patent is hereby corrected as shown below:

COLUMN 2:
　　　　Line 46, "are" should read -- are not --.

COLUMN 4:
　　　　Line 58, "printing." should read -- printing; --.

COLUMN 6:
　　　　Line 39, "cartridge ITC," should read -- cartridge IJC, --.

COLUMN 13:
　　　　Line 46, "realize" should read -- realizes --.
　　　　Line 63, "are" should read -- is --.

COLUMN 14:
　　　　Line 41, "recieved" should read -- received --.
　　　　Line 54, "before" should read -- after --.

COLUMN 16:
　　　　Line 9, "detecton" should read -- detection --.
　　　　Line 18, "interrution." should read -- interruption. --.
　　　　Line 27, "nozzels," should read -- nozzles, --.
　　　　Line 38, "control" should begin a new paragraph and be indented, and "interrution" should read -- interruption --.
　　　　Line 44, "interupt" should read -- interrupt --.

UNITED STATES PATENT AND TRADEMARK OFFICE
CERTIFICATE OF CORRECTION

PATENT NO. : 7,359,073 B2
APPLICATION NO. : 10/410301
DATED : April 15, 2008
INVENTOR(S) : Hiroshi Uemura It is certified that error appears in the above-identified patent and that said Letters Patent is hereby corrected as shown below:

COLUMN 17:
      Line 2, "nozzels," should read -- nozzles, --.
      Line 13, "interup" should read -- interrupt --.

Signed and Sealed this

Third Day of March, 2009

JOHN DOLL
*Acting Director of the United States Patent and Trademark Office*